US012800950B2

(12) United States Patent
Walker

(10) Patent No.: US 12,800,950 B2
(45) Date of Patent: Nov. 17, 2026

(54) TRAVELLING WAVE ELECTRO-OPTIC MODULATOR

(71) Applicant: Axenic Limited, Sedgefield (GB)

(72) Inventor: Rob Walker, Crook (GB)

(73) Assignee: Axenic Limited, Sedgefield (GB)

( * ) Notice: Subject to any disclaimer, the term of this patent is extended or adjusted under 35 U.S.C. 154(b) by 655 days.

(21) Appl. No.: 18/324,022

(22) Filed: May 25, 2023

(65) Prior Publication Data

US 2023/0384623 A1 Nov. 30, 2023

(30) Foreign Application Priority Data

May 26, 2022 (GB) ...................................... 2207748

(51) Int. Cl.
*G02F 1/01* (2006.01)

(52) U.S. Cl.
CPC ........ *G02F 1/011* (2013.01); *G02F 2201/127* (2013.01); *G02F 2202/101* (2013.01); *G02F 2202/16* (2013.01)

(58) Field of Classification Search
CPC ............... G02F 1/011; G02F 2201/127; G02F 2202/101; G02F 2202/16
See application file for complete search history.

(56) References Cited

U.S. PATENT DOCUMENTS 3,694,673 A * 9/1972 Au ......................... H10D 99/00 257/E27.035
4,057,823 A * 11/1977 Burkhardt .............. H10D 48/30 257/E29.166

(Continued)

FOREIGN PATENT DOCUMENTS

GB 2211986 A * 7/1989 ......... H01L 23/4821
GB 2361071 B * 10/2002 ........... G02F 1/0327

(Continued)

OTHER PUBLICATIONS

English language text of JP-2015129906-A (Year: 2015).*

(Continued)

*Primary Examiner* — Peter Radkowski
(74) *Attorney, Agent, or Firm* — Quinn IP Law

(57) ABSTRACT

A travelling wave electro-optic modulator comprising
a substrate;
first and second parallel spaced apart electrode strips arranged on the substrate;
first and second optical waveguides arranged on the substrate, the optical waveguides being positioned between the first and second electrode strips and extending parallel thereto;
the first electrode strip comprising at least one portion extending proximate to the first optical waveguide;
the second electrode strip comprising at least one portion extending proximate to the second optical waveguide;
a semiconductive backplane layer arranged within the substrate and extending between the waveguides; and,
a matched termination connected to the first and second electrode strips, the matched termination comprising
(a) a serpentine electrically conductive strip arranged on the substrate and connecting the first and second electrode strips together; and,
(b) a semiconductive backplane matching element, the backplane matching element comprising a plurality of semiconductive backplane plates connected together by at least one semiconductive backplane arm, the plates and at least one backplane arm being arranged within the substrate, the plates being arranged proximate to the electrode strips such that each electrode strip is capacitively coupled to at least one backplane plate;

(Continued)

the serpentine electrically conductive strip being arranged such that at least a portion of its length is proximate to at least one backplane arm such that the two are electrically coupled together.

14 Claims, 7 Drawing Sheets

(56) References Cited

U.S. PATENT DOCUMENTS

| | | | | |
|---|---|---|---|---|
| 5,263,102 | A * | 11/1993 | Hakogi | G02F 1/225 385/2 |
| 5,675,673 | A * | 10/1997 | Skeie | G02F 1/225 385/40 |
| 6,650,458 | B1 * | 11/2003 | Prosyk | G02F 1/225 385/9 |
| 6,717,193 | B2 * | 4/2004 | Olewine | H10D 1/041 257/295 |
| 7,174,080 | B2 * | 2/2007 | Walker | G02B 6/14 385/132 |
| 7,184,207 | B1 * | 2/2007 | Walker | G02F 1/025 359/344 |
| 7,899,277 | B2 * | 3/2011 | Koh | G02F 1/0356 385/2 |
| 8,280,201 | B2 * | 10/2012 | Prosyk | G02F 1/225 359/239 |
| 8,903,202 | B1 * | 12/2014 | Prosyk | G02F 1/225 385/2 |
| 9,008,469 | B2 * | 4/2015 | Prosyk | G02F 1/225 385/2 |
| 9,069,223 | B2 * | 6/2015 | Prosyk | G02F 1/225 |
| 9,244,327 | B2 * | 1/2016 | Prosyk | G02F 1/225 |
| 9,482,925 | B2 * | 11/2016 | Prosyk | G02F 1/2255 |
| 10,678,112 | B2 * | 6/2020 | Parvizi | G02F 1/2255 |
| 11,947,237 | B2 * | 4/2024 | Ozaki | G02F 1/2257 |
| 2003/0189744 | A1 * | 10/2003 | Prosyk | G02F 1/3136 359/237 |
| 2003/0190107 | A1 * | 10/2003 | Walker | G02F 1/225 385/2 |
| 2004/0131310 | A1 * | 7/2004 | Walker | G02B 6/136 385/39 |
| 2005/0095741 | A1 * | 5/2005 | Johnstone | G02B 6/126 438/31 |
| 2005/0123242 | A1 * | 6/2005 | Walker | G02F 1/2257 385/40 |
| 2005/0147351 | A1 * | 7/2005 | Johnstone | G02F 1/3133 385/40 |
| 2006/0120655 | A1 * | 6/2006 | Walker | G02F 1/0123 385/9 |
| 2009/0297088 | A1 * | 12/2009 | Koh | G02F 1/0356 385/2 |
| 2010/0150494 | A1 * | 6/2010 | Prosyk | G02B 6/136 216/13 |
| 2011/0135242 | A1 * | 6/2011 | Prosyk | G02F 1/225 385/3 |
| 2011/0158576 | A1 * | 6/2011 | Kissa | G02F 1/225 385/2 |
| 2012/0230627 | A1 * | 9/2012 | Motoya | G02F 1/2255 385/3 |
| 2013/0209023 | A1 * | 8/2013 | Prosyk | G02F 1/011 385/3 |
| 2014/0153860 | A1 * | 6/2014 | Prosyk | G02F 1/225 385/3 |
| 2015/0036965 | A1 * | 2/2015 | Prosyk | G02F 1/2255 385/3 |
| 2015/0286108 | A1 * | 10/2015 | Prosyk | G02F 1/225 385/3 |
| 2019/0129273 | A1 | 5/2019 | Tanaka et al. | |
| 2020/0004102 | A1 | 1/2020 | Kono et al. | |
| 2020/0081314 | A1 * | 3/2020 | Parvizi | G02F 1/2255 |
| 2020/0234171 | A1 * | 7/2020 | Chu | H10D 48/383 |
| 2021/0124232 | A1 | 4/2021 | Ozaki et al. | |
| 2021/0157177 | A1 * | 5/2021 | Kharel | G02F 1/0356 |
| 2021/0311336 | A1 * | 10/2021 | Kharel | G02F 1/0356 |
| 2021/0341812 | A1 | 11/2021 | Kanazawa et al. | |
| 2021/0373364 | A1 * | 12/2021 | Zhang | G02F 1/2255 |
| 2022/0050349 | A1 * | 2/2022 | Ozaki | G02F 1/212 |

FOREIGN PATENT DOCUMENTS

| | | | |
|---|---|---|---|
| JP | 2015129906 | A * | 7/2015 |
| WO | 1997037276 | A1 | 10/1997 |

OTHER PUBLICATIONS

Selim Dogru and Nadir Dagli, "0.77-V drive voltage electro-optic modulator with bandwidth exceeding 67 GHz," Opt. Lett. 39, 6074-6077 (Year: 2014).*

Walker et al., Electro-optic modulators for space using gallium arsenide, International Conference on Space Optics—ICSO 2016, 2016, Proceedings vol. 10562, International Conference on Space Optics—ICSO 2016; 105621A Biarritz, France; https://doi.org/10.1117/12.2296173 (Year: 2017).*

Walker et al., The Design of 50 GHz Gallium Arsenide Electro-Optic Modulator Arrays for Satellite Communications Systems, Frontiers in Physics, vol. 9—Feb. 2021; https://www.frontiersin.org/journals/physics/articles/10.3389/fphy.2021.636002;DOI=10.3389/fphy.2021.636002 (Year: 2021).*

Shin, Jaehyuk & Sakamoto, Steven & Dagli, Nadir. (2011). Conductor Loss of Capacitively Loaded Slow Wave Electrodes for High-Speed Photonic Devices. Lightwave Technology, Journal of. 29. 48-52. 10.1109/JLT.2010.2091624. (Year: 2011).*

UKIPO Search report for GB Application No. GB2207748.1, dated Nov. 24, 2022.

The extended European Search report for European application No. EP23174297 dated Oct. 18, 2023.

* cited by examiner

TRAVELLING WAVE ELECTRO-OPTIC MODULATOR

CROSS-REFERENCE TO RELATED APPLICATION

This application claims priority to and the benefit of Great Britain Patent Application GB2207748.1 filed 26 May 2022, which is hereby incorporated by reference in its entirety.

TECHNICAL FIELD

The present invention relates to a travelling wave electro-optic modulator.

SUMMARY

The present invention relates to a travelling wave electro-optic modulator. More particularly, but not exclusively, the present invention relates to a travelling wave electro-optic modulator comprising a matched termination connected to electrode strips of the electro-optic modulator, the matched termination comprising a serpentine metallic strip connecting the electrode strips together and a semiconductive backplane matching element arranged within the substrate of the modulator, the serpentine metallic strip and backplane matching element being capacitively coupled together with the backplane matching element being further capacitively coupled to the electrode strips.

Travelling wave electro-optic modulators are well known in the field of electro-optic devices. During operation RF waves travel along transmission line electrode strips arranged on either side of optical waveguides. When these travelling waves reach the end of the electrode strips it is essential they are not reflected back along the electrode strips as this has an adverse effect on the operation of the device and on the electrical system driving it. A typical limit on normalised reflective RF power at the device input is −10 dB. Scattering parameter S11 is conventionally used to denote this quantity.

It is known to terminate such electrode strips with a single resistive shunt path which is matched to the impedance of the electrode strips. This approach however has a number of drawbacks. The resistive element must be small enough to behave as a lumped element at the highest frequencies of interest. If integrated into the modulation device heat dissipation during operation must be properly managed. The presence of essentially a point heat source close to the optical waveguides can destabilise the operation of the electro-optic modulator. If external to the modulator such resistive elements need to be wire bonded to the ends of the electrode strips inevitably producing an RF discontinuity which causes reflections which rise with frequency. The addition of these external components to the electro-optic modulator increases the cost and complexity of manufacture of the electro-optic modulator.

The present invention seeks to overcome the problems of the prior art.

a. Accordingly, the present invention provides a travelling wave electro-optic modulator comprising: a substrate; first and second parallel spaced apart electrode strips arranged on the substrate; first and second optical waveguides arranged on the substrate, the optical waveguides being positioned between the first and second electrode strips and extending parallel thereto; the first electrode strip comprising at least one portion extending proximate to the first optical waveguide; the second electrode strip comprising at least one portion extending proximate to the second optical waveguide; a semiconductive backplane layer arranged within the substrate and extending between the waveguides; and, a matched termination connected to the first and second electrode strips, the matched termination comprising: a.) a serpentine electrically conductive strip arranged on the substrate and connecting the first and second electrode strips together; and, b.) a semiconductive backplane matching element, the backplane matching element comprising a plurality of semiconductive backplane plates connected together by at least one semiconductive backplane arm, the plates and at least one backplane arm being arranged within the substrate, the plates being arranged proximate to the electrode strips such that each electrode strip is capacitively coupled to at least one backplane plate; the serpentine electrically conductive strip being arranged such that at least a portion of its length is proximate to at least one backplane arm such that the two are electrically coupled together.

The matched termination of the travelling wave electro-optic modulator according to the invention is a distributed structure. Heat can therefore be advantageously distributed over a wider area. Further, the matched termination can be manufactured entirely within the same foundry process as the rest of the device. The matched termination can therefore be included in the travelling wave electro-optic modulator during manufacture at no extra cost. Further, since the matched termination is manufactured integrally as part of the travelling wave electro-optic modulator there is no need to wire bond the matched termination to the waveguide strips. This eliminates any RF discontinuities and their associated reflection of RF travelling waves.

Preferably for at least one of the first and second electrodes the at least one portion is a T rail.

Preferably the serpentine strip is a metal strip.

Preferably the travelling wave electro-optic modulator further comprises a third electrode strip parallel to the first and second electrode strips.

Preferably the matched termination is further connected to the third electrode strip with the serpentine strip connecting the first, second and third electrode strips together.

Preferably the serpentine electrically conductive strip and backplane matching element are arranged in parallel spaced apart planes.

Preferably when viewed along a direction normal to the parallel spaced apart planes the serpentine electrically conductive strip and backplane matching element at least partially overlap.

Preferably each backplane arm is U shaped, at least a portion of the U overlapping with the serpentine electrically conductive strip when viewed along the direction normal to the parallel spaced apart planes.

Preferably at least one backplane arm comprises a backplane spur portion, at least a portion of the backplane spur portion overlapping with the serpentine electrically conductive strip when viewed along the direction normal to the parallel spaced apart planes.

Preferably the serpentine electrically conductive strip comprises a plurality of substantially parallel straight portions connected together by U shaped portions, at least some of the straight portions and U shaped portions overlapping the backplane matching element when viewed along the direction normal to the parallel spaced apart planes.

Preferably the serpentine electrically conductive strip and backplane matching element are configured such that the slope of the RF reflection coefficient as a function of frequency for one is substantially equal and opposite to that of the other at the point of crossover of the two.

Preferably the travelling wave electro-optic modulator further comprises an optical source connected to the optical waveguides.

Preferably the travelling wave electro-optic modulator further comprises an RF source connected to the first, second and central electrode strips.

Preferably the backplane matching element comprises an n doped AlGaAs portion arranged within the substrate.

BRIEF DESCRIPTION OF THE DRAWINGS

The present invention will now be described by way of example only and not in any limitative sense with reference to the accompanying drawings in which.

DETAILED DESCRIPTION

Figure 1:
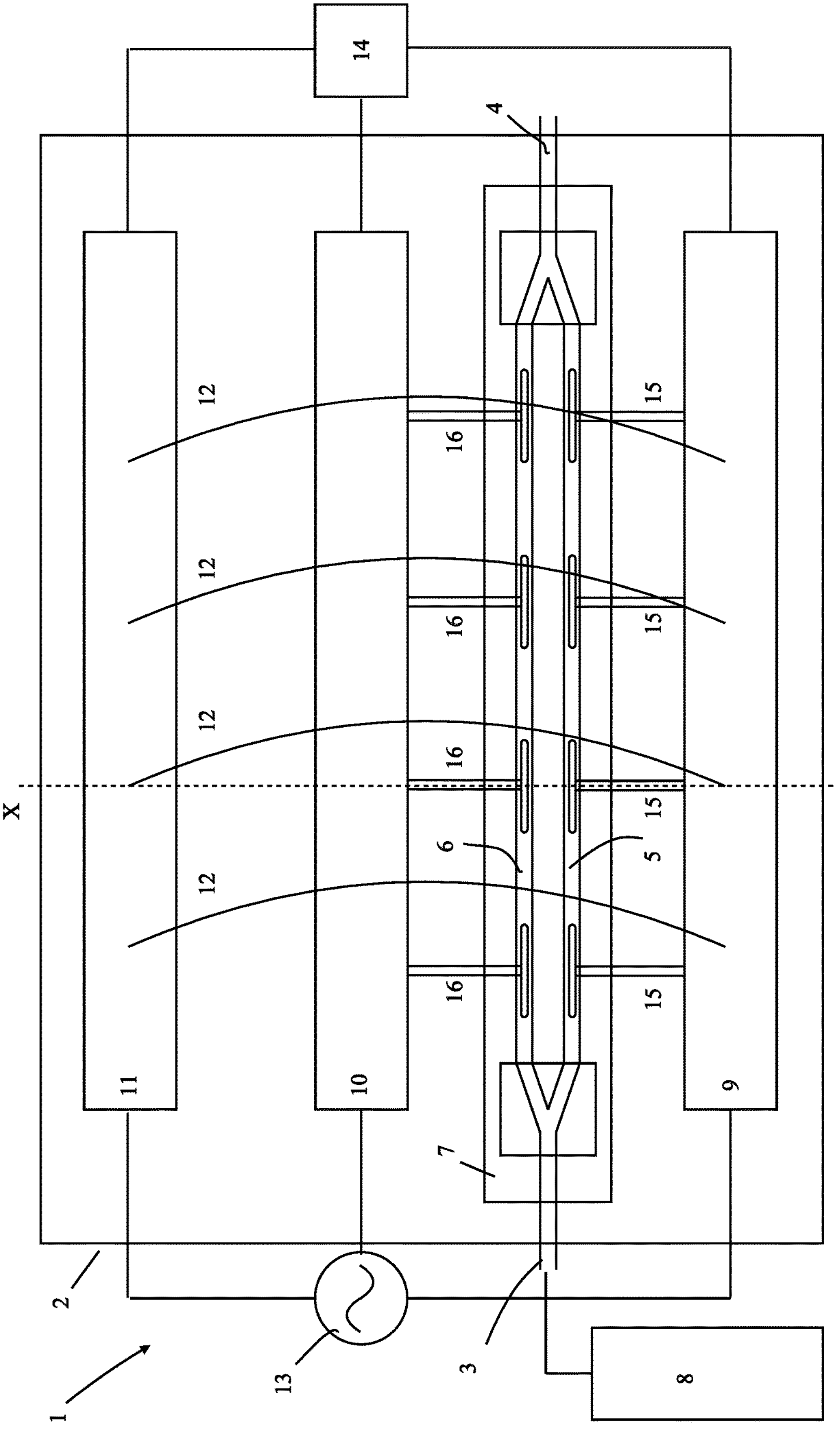
FIG. 1 shows in schematic plan view a travelling wave electro-optic modulator according to the invention.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Those having ordinary skill in the art will recognize that terms such as "above," "below," "upward," "downward," "top," "bottom," etc., are used descriptively for the figures, and do not represent limitations on the scope of the disclosure, as defined by the appended claims. Referring to the drawings wherein like reference numbers represent like components throughout the several figures, the elements shown in FIGS. 1-7 are not necessarily to scale or proportion. Accordingly, the particular dimensions and applications provided in the drawings presented herein are not to be considered limiting.

Shown in FIG. 1 in schematic plan view is a travelling wave electro-optic modulator 1 according to the invention. The travelling wave electro-optic modulator 1 comprises an insulating or semi-insulating substrate 2. Arranged on the substrate 2 are input and output optical waveguides 3,4 having first and second optical waveguides 5,6 extending therebetween. The first and second optical waveguides 5,6 are of substantially equal length. Arranged beneath the first and second optical waveguides 5,6 within the substrate 2 is a semiconductive backplane layer 7. An optical source 8 is connected to the input optical waveguide 3. Also arranged on the substrate are first and second parallel, spaced apart electrode strips 9,10. The optical waveguides 5,6 are arranged between the first and second electrode strips 9,10 and extend parallel thereto as shown.

A third electrode strip 11 is also arranged on the substrate 2 parallel to the second electrode strip 10 and on the opposite side of the second electrode strip 10 to the optical waveguides 5,6. Electrical connections 12 extend between the first and third electrode strips 9,11.

A first end of each of the first, second and third electrode strips 9,10,11 is connected to an RF source 13. The second opposite ends of each of the first, second and third electrode strips 9,10,11 is connected to a matched termination 14.

The first electrode strip 9 comprises a plurality of electrically conductive portions 15 (in this embodiment T rails) which extend proximate to the first optical waveguide 5. Similarly, the second electrode strip 10 comprises a plurality of electrically conductive portions 16 (again T rails) which extend to proximate to the second optical waveguide 6.

In use the optical source 8 provides a coherent light beam to the input optical waveguide 3. From here it is split approximately equally between the first and second optical waveguides 5,6. The light travels along the first and second optical waveguides 5,6 before being recombined at the output optical waveguide 4. If the light in the first optical waveguide 5 is in phase with the light in the second optical waveguide 6 at the point of recombination then the light in the two waveguides 5,6 combines constructively. However, if the light in the first optical waveguide 5 is not in phase with the light in the second optical waveguide 6 at the point of recombination then the light in the two waveguides 5,6 will not combine constructively. Accordingly, by controlling the phase relation between the light in the two waveguides 5,6 at the point of recombination one can control the intensity of the light output by the output optical waveguide 4.

At the same time that the optical source 8 provides light to the input optical waveguide 3, the RF source 13 provides an RF travelling wave to each of the first, second and third electrode strips 9,10,11. The electromagnetic fields generated in the optical waveguides 5,6 by means of the T rails 15,16 interact with the light passing along the first and second optical waveguides 5,6 so altering the phase of the light in the first and second optical waveguides 5,6. Accordingly, by supplying appropriate RF travelling waves to the first, second and third electrode strips 9,10,11 one can control the intensity of light output by the output optical waveguide 4.

A problem arises when the RF travelling waves reach the end of the electrode strips 9,10,11. If the travelling waves are reflected back towards the RF source 13 then these reflected travelling RF waves interfere with the incident RF travelling waves so negatively affecting the operation of the travelling wave electro-optic modulator 1. In order to overcome this problem the travelling wave electro-optic modulator 1 comprises a matched termination 14 connected to the first, second and third electrode strips 9,10,11 and which has an impedance matched to the line impedance of the first, second and third electrode strips 9,10,11, so eliminating any reflected travelling RF waves. The matched termination 14 is described in more detail below.

Figure 2:
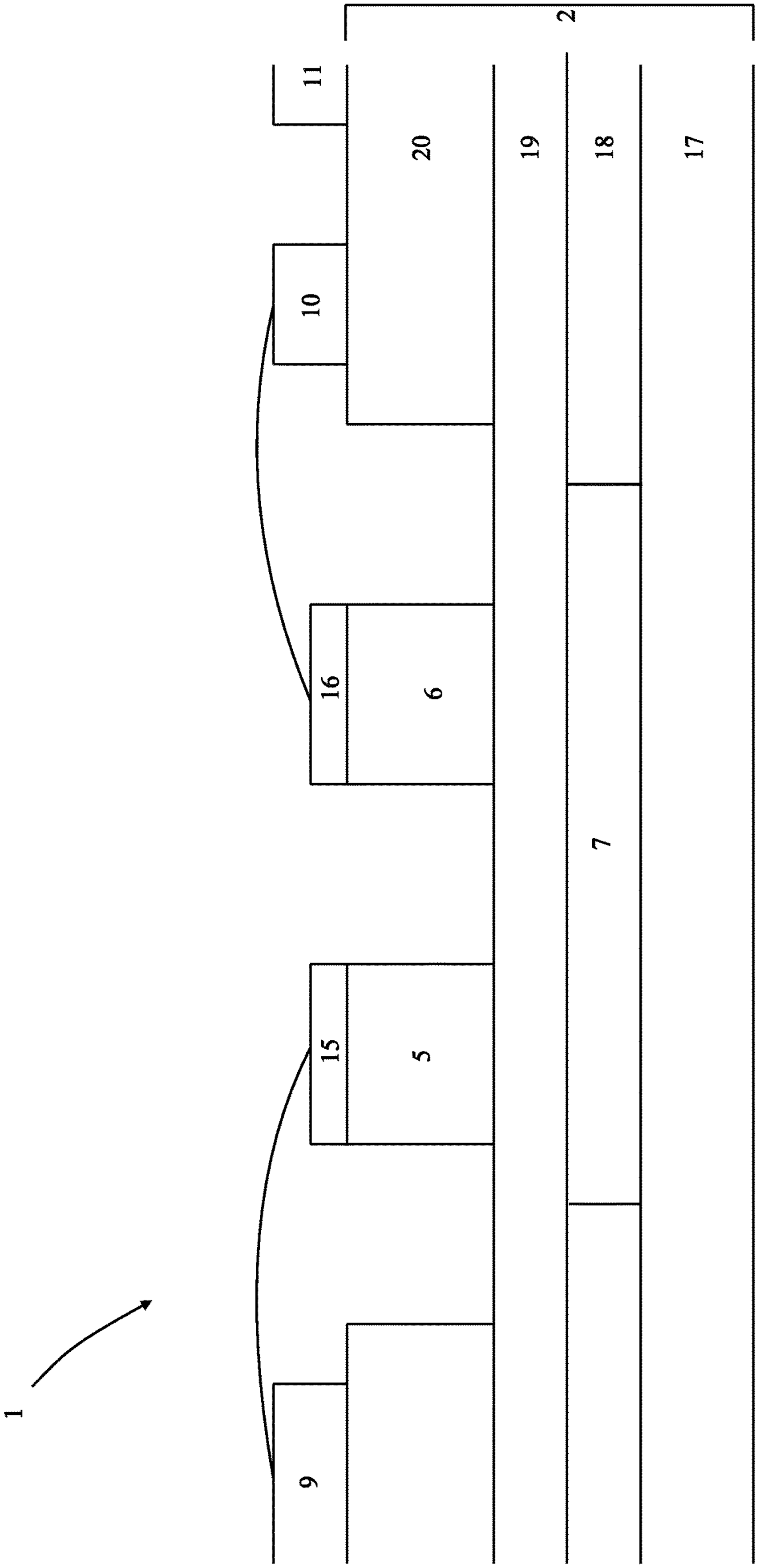
FIG. 2 shows the travelling wave electro-optic modulator of FIG. 1 in vertical cross section.

Shown in FIG. 2 is the travelling wave electro-optical modulator 1 of FIG. 1 in vertical cross section through line X of FIG. 1. The substrate 2 comprises an insulating bottom GaAs layer 17, an insulating bottom AlGaAs layer 18 arranged on the insulating bottom GaAs layer 17, an insulating top GaAs layer 19 arranged on the insulating bottom AlGaAs layer 18 and an insulating top AlGaAs layer 20 arranged on the insulating top GaAs layer 19. The first and second optical waveguides 5,6 are insulating AlGaAs and are arranged on the top GaAs layer 19 as shown. A portion 7 of the bottom AlGaAs layer 18 is n doped so that is it electrically semiconductive and forms the semiconductive backplane layer 7 arranged within the substrate 2 beneath the first and second optical waveguides 5,6 and extending therebetween.

The first, second and third waveguide strips 9,10,11 are arranged on the top AlGaAs layer 20. The T rails 15,16 extend from the first and second electrode strips 9,10 onto the top faces of the optical waveguides 5,6 as shown.

Figure 3:
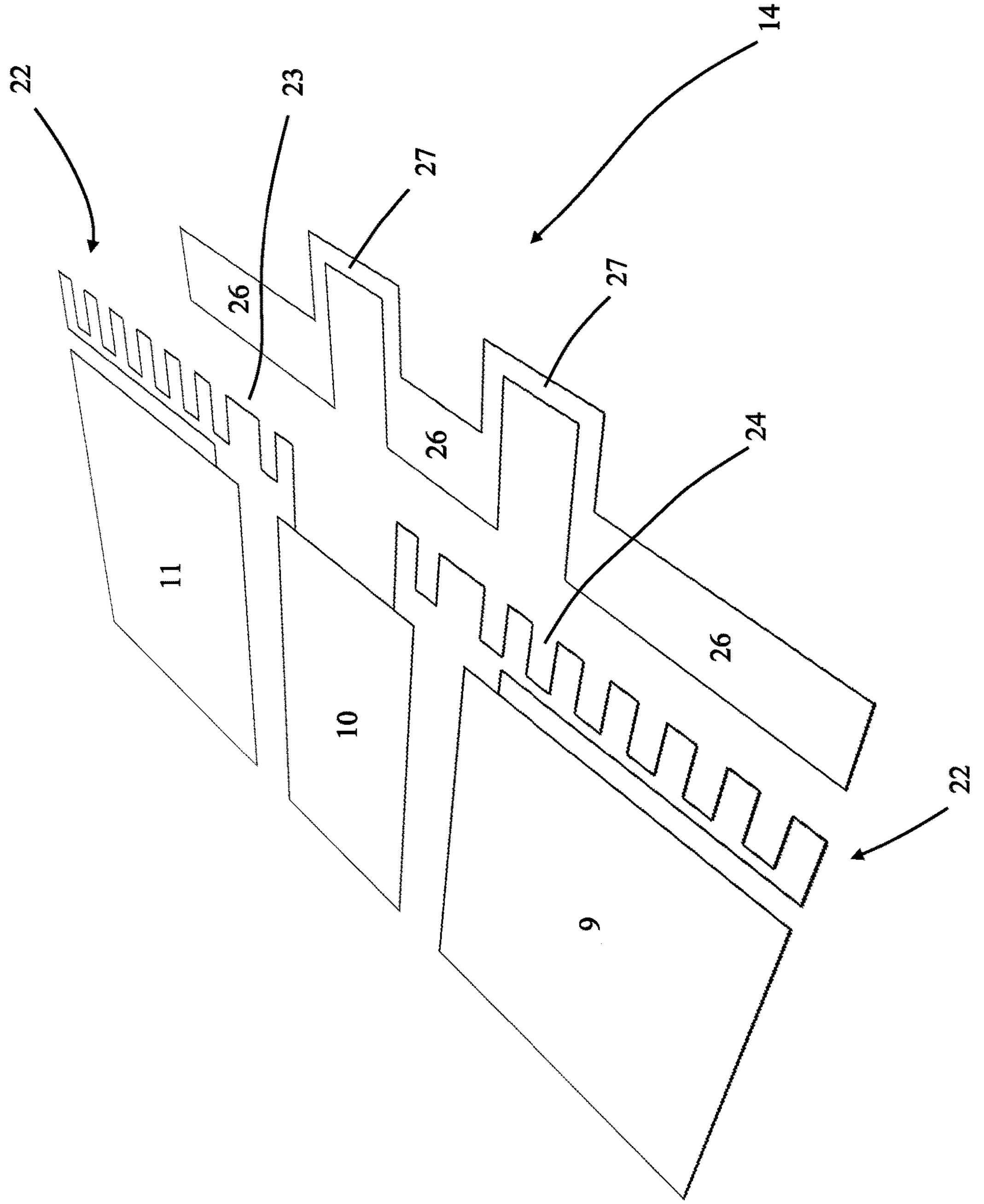
FIG. 3 shows the ends of the electrode strips and matched termination of an embodiment of a travelling wave electro-optic modulator according to the invention in perspective view.

FIG. 3 shows the ends of the first, second and third electrode strips 9,10,11 and the matched termination 14 connected thereto in perspective view. For clarity other elements of the travelling wave electro-optical modulator 1 are not shown.

The matched termination 14 comprises a serpentine, electrically conductive (in this case a metal) strip 22 arranged on the top AlGaAs layer 20. A first portion of the serpentine strip 22 connects the first and second electrode strips 9,10 together. A second portion of the serpentine strip 22 connects the second and third electrode strips 10,11 together. The serpentine metallic strip 22 is typically a tri-metal evaporated structure of titanium, platinum and gold. The thickness of the serpentine metallic strip 22 is tightly controlled and hence is highly consistent. The serpentine metallic strip 22 comprises a plurality of straight portions 23 connected together by a plurality of U shaped portions 24. The length of the straight portions 23, to some degree, determines the resistance of the serpentine metallic strip 22 whilst the number of U shaped portions 24, at least to some extent, determines its inductance.

The matched termination 14 further comprises a semiconductive backplane matching element 25 arranged within the substrate 2. The backplane matching element 25 is formed by an n doped semiconductive portion of the bottom AlGaAs layer 18 surrounded at its edges by an insulating portion of the bottom AlGaAs layer 18. The serpentine metallic strip 22 and the backplane matching element 25 are therefore arranged in parallel spaced apart planes separated by insulating material. The backplane matching element 25 is shaped as a plurality of semiconductive backplane plates 26 connected together by semiconductive U shaped backplane arms 27.

Figure 4:
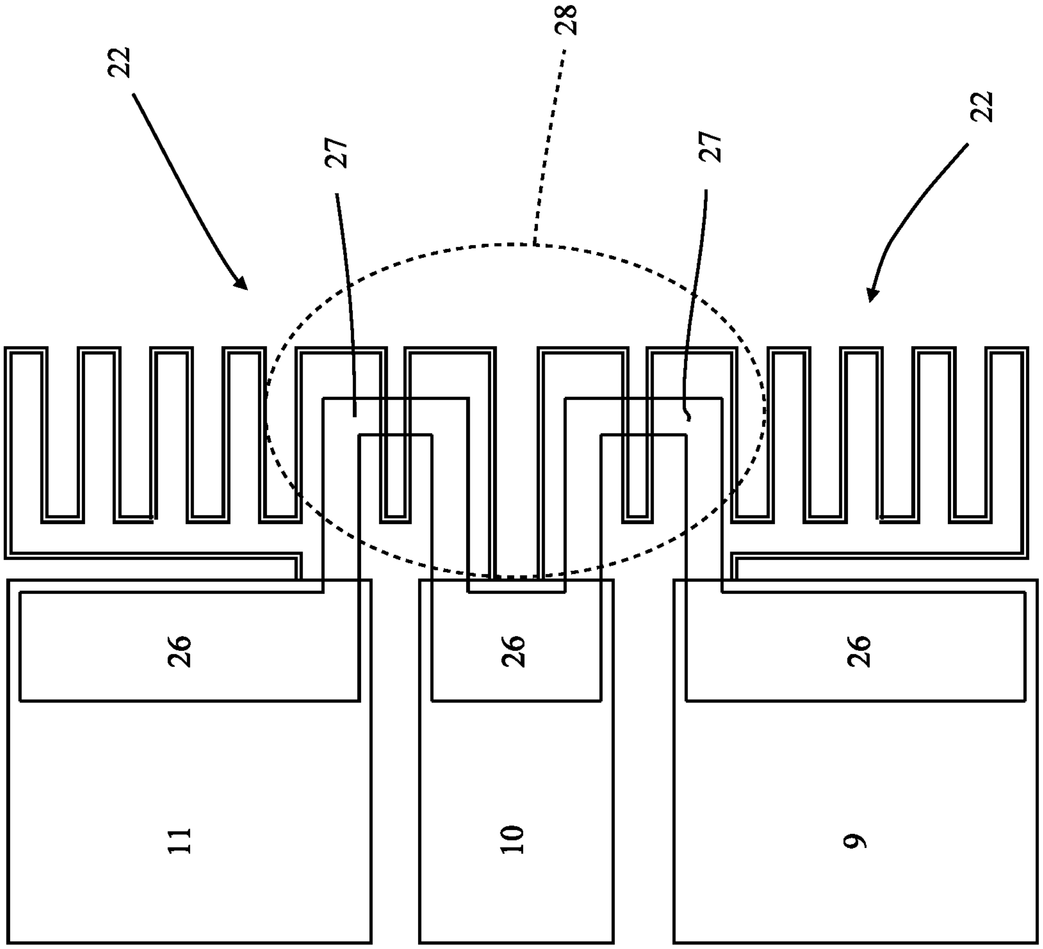
FIG. 4 shows the ends of the electrode strips and matched termination of FIG. 3 in plan view.

The spatial relationship between the electrode strips 9,10,11, the serpentine metallic strip 22 and backplane matching element 25 is best shown in FIG. 4. FIG. 4 shows these elements viewed along a direction normal to the parallel spaced apart planes. For the serpentine metallic strip 22, this extends beyond the ends of the electrode strips 9,10,11. As for the backplane matching element 25 the backplane plates 26 are arranged underneath and spaced apart from the ends of the electrode strips 9,10,11 along the direction of view so that the electrode strips 9,10,11 and backplane plates 26 are capacitively coupled together. The backplane arms 27 extend beyond the ends of the electrode strips 9,10,11. The backplane arms 27 and the serpentine metallic strip 22 are arranged such that when viewed along the direction normal to the parallel planes the backplane arms 27 and serpentine metallic strip 22 at least partially overlap in a coupling region 28. In the coupling region 28 the serpentine metallic strip 22 is proximate to the backplane arms 27 and so the two are electrically coupled together.

Figure 5:
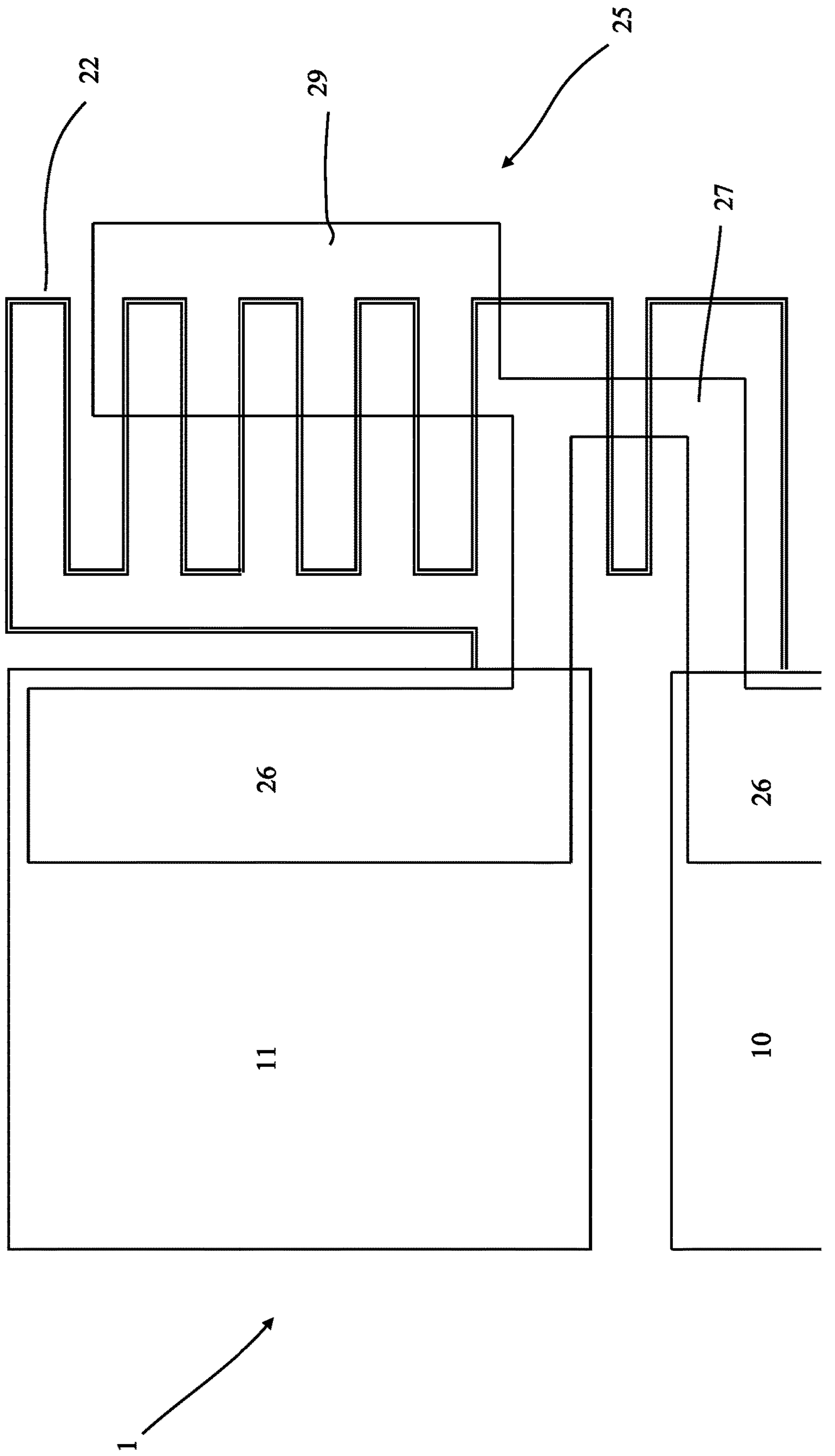
FIG. 5 shows the ends of the electrode strips and matched termination of an alternative embodiment of a travelling wave electro-optic modulator according to the invention in plan view.

FIG. 5 shows a similar view as FIG. 4 for a further embodiment of a travelling wave electro-optic modulator 1 according to the invention. Only the second and third electrode strips 10,11 are shown. This differs from the embodiment of FIG. 4 in that the backplane arm 27 comprises a backplane spur portion 29. The backplane spur portion 29 overlaps with a portion of the serpentine metallic strip 22 which increases the size of the coupling region 28 and so increases the electrical coupling between the serpentine metallic strip 22 and the backplane matching element 25.

Figure 6:
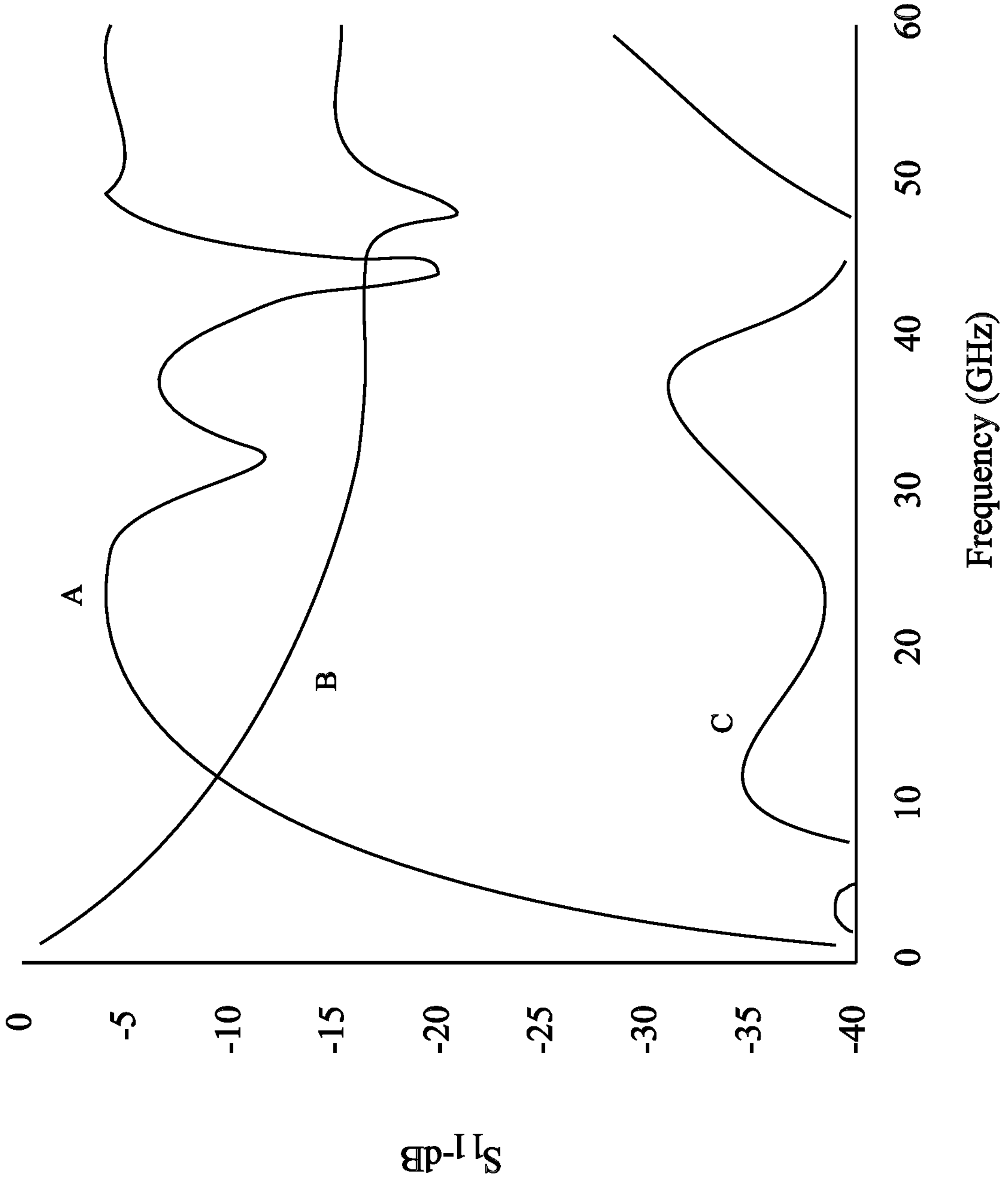
FIG. 6 shows the reflection coefficient as a function of frequency for a matched termination comprising a serpentine metallic strip only, a matched termination comprising a backplane matching element only and a matched termination according to the invention; and, FIG. 7 shows the ends of the electrode strips and matched termination of a further embodiment of a travelling wave electro-optic waveguide according to the invention in plan view.

Shown in FIG. 6 is the reflection coefficient as a function of frequency for a matched termination 14 comprising the serpentine metal strip 22 only, a matched termination 14 comprising the backplane matching element 25 only and a matched termination 14 comprising both the serpentine metal strip 22 and backplane matching element 25 according to the invention as described in FIG. 5. These are curves A, B and C respectively.

Considering first the serpentine metallic strip 22 only, at DC and low frequencies the resistive behaviour of the serpentine metallic strip 22 dominates and so the reflectance is low. As the frequency increases however the inductive reactance of the serpentine metallic strip 22 dominates and the serpentine metallic strip 22 increasingly looks like an open circuit.

Considering the backplane matching element 25 only, the capacitive coupling between the backplane matching element 25 and the electrode strips 9,10,11 means that the backplane matching element 25 increasingly looks like an open circuit towards DC.

As can be seen from curve C a matched termination 14 according to the invention comprising both a serpentine metallic strip 22 and a backplane matching element 25 performs significantly better than either a serpentine metallic strip 22 alone or a backplane matching element 25 alone. This is due to the complex electromagnetic interaction between the serpentine metallic strip 22 and the backplane matching element 25 in the coupling region 28.

Curve C is only one example of the behaviour of a matched termination 14 according to the invention. One can tune the behaviour of the matched termination 14 of the travelling wave electro-optic modulator 1 according to the invention by tuning the behaviour of either or both of the serpentine metallic strip 22 and the backplane matching element 25. One can tune the behaviour of the serpentine metallic strip 22 by adjusting its geometry, in particular by changing the length of the straight sections 23 and the number of U sections 24. One can tune the behaviour of the backplane matching element 25 by adjusting the area of the backplane plates 26 and/or the distance the backplane plates 26 extend along the electrode strips 9,10,11. One can further tune the behaviour of the matched termination 14 by changing the size of the coupling region 28 again by changing the geometry of the serpentine metallic strip 22 or the geometry of the backplane arms 27 or by adding backplane spurs 29 to the backplane arms 27. Generally speaking it is desired to tune the serpentine metallic strip 22 and the backplane matching element 25 so that the slope of the RF reflection coefficient as a function of frequency for one is substantially equal and opposite in sign to that of the other at the point of the crossover of the two (ie at the point where curves A and B cross).

Figure 7:
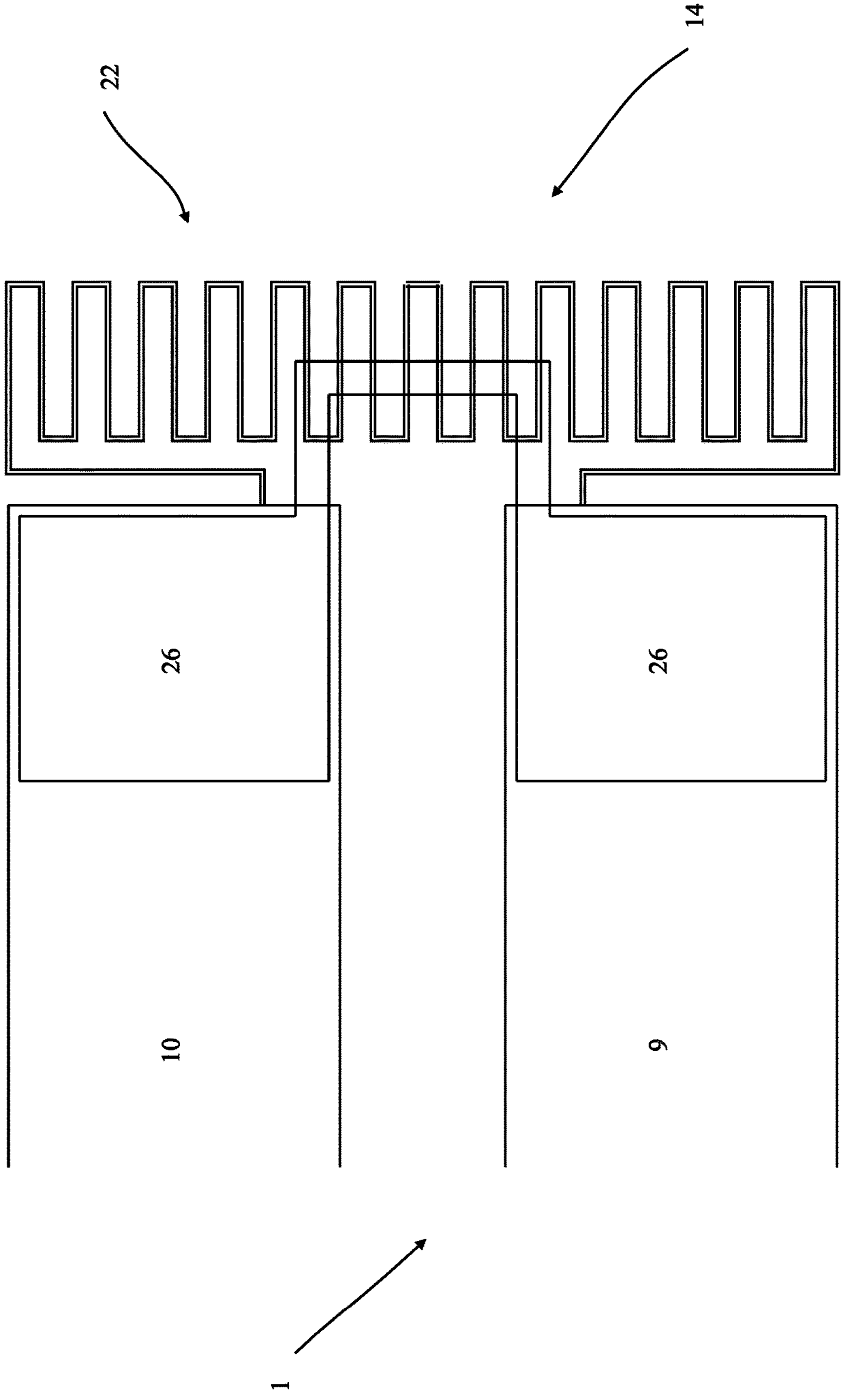

Shown in FIG. 7 are the ends of the electrode strips 9,10 and matched termination 14 of a further embodiment of a travelling wave electro-optic modulator 1 according to the invention. This embodiment is similar to that described above except it comprises first and second electrode strips 9,10 only.

In the above embodiments the substrate 2 is GaAs based. In alternative embodiments the travelling wave electro-optic modulator 1 is a silicon or InP based device.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of 'comprising' and "including" to provide more specific embodiments and are also disclosed. As used in this disclosure and in the appended claims, the singular forms "a", "an", "the", include plural referents unless the context clearly dictates otherwise.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A travelling wave electro-optic modulator comprising:

a substrate;

first and second parallel spaced apart electrode strips arranged on the substrate;

first and second optical waveguides arranged on the substrate, the optical waveguides being positioned between the first and second electrode strips and extending parallel thereto;

the first electrode strip comprising at least one portion extending proximate to the first optical waveguide;

the second electrode strip comprising at least one portion extending proximate to the second optical waveguide;

a semiconductive backplane layer arranged within the substrate and extending between the waveguides; and, a matched termination connected to the first and second electrode strips, the matched termination comprising:

(a) a serpentine electrically conductive strip arranged on the substrate and connecting the first and second electrode strips together; and, (b) a semiconductive backplane matching element, the backplane matching element comprising a plurality of semiconductive backplane plates connected together by at least one semiconductive backplane arm, the plates and at least one backplane arm being arranged within the substrate, the plates being arranged proximate to the electrode strips such that each electrode strip is capacitively coupled to at least one backplane plate;

the serpentine electrically conductive strip being arranged such that at least a portion of its length is proximate to at least one backplane arm such that the two are electrically coupled together.

2. The travelling wave electro-optic modulator as claimed in claim 1, wherein for at least one of the first and second electrodes the at least one portion is a T rail.

3. The travelling wave electro-optic modulator as claimed in claim 1, wherein the serpentine strip is a metal strip.

4. The travelling wave electro-optic modulator as claimed in claim 1, further comprising a third electrode strip parallel to the first and second electrode strips.

5. The travelling wave electro-optic modulator as claimed in claim 4, wherein the matched termination is further connected to the third electrode strip with the serpentine strip connecting the first, second and third electrode strips together.

6. The travelling wave electro-optic modulator as claimed in claim 1, wherein the serpentine electrically conductive strip and backplane matching element are arranged in parallel spaced apart planes.

7. The travelling wave electro-optic modulator as claimed in claim 6, wherein when viewed along a direction normal to the parallel spaced apart planes the serpentine electrically conductive strip and backplane matching element at least partially overlap.

8. The travelling wave electro-optic modulator as claimed in claim 7, wherein each backplane arm is U shaped, at least a portion of the U overlapping with the serpentine electrically conductive strip when viewed along the direction normal to the parallel spaced apart planes.

9. The travelling wave electro-optic modulator as claimed in claim 7, wherein at least one backplane arm comprises a backplane spur portion, at least a portion of the backplane spur portion overlapping with the serpentine electrically conductive strip when viewed along the direction normal to the parallel spaced apart planes.

10. The travelling wave electro-optic modulator as claimed in claim 7, wherein the serpentine electrically conductive strip comprises a plurality of substantially parallel straight portions connected together by U shaped portions, at least some of the straight portions and U shaped portions overlapping the backplane matching element when viewed along the direction normal to the parallel spaced apart planes.

11. The travelling wave electro-optic modulator as claimed in claim 1, wherein the serpentine electrically conductive strip and backplane matching element are configured such that the slope of the RF reflection coefficient as a function of frequency for one is substantially equal and opposite to that of the other at the point of crossover of the two.

12. The travelling wave electro-optic modulator as claimed in claim 1, further comprising an optical source connected to the optical waveguides.

13. The travelling wave electro-optic modulator as claimed in claim 12, further comprising an RF source connected to the first, second and central electrode strips.

14. The travelling wave electro-optic modulator as claimed in claim 1, wherein the backplane matching element comprises an n doped AlGaAs portion arranged within the substrate.

* * * * *